United States Patent
Hirai et al.

(10) Patent No.: US 9,488,869 B2
(45) Date of Patent: Nov. 8, 2016

(54) LIQUID CRYSTAL DISPLAY DEVICE AND METHOD FOR MANUFACTURING SAME

(71) Applicant: Sharp Kabushiki Kaisha, Osaka-shi, Osaka (JP)

(72) Inventors: Akira Hirai, Osaka (JP); Hiroaki Asagi, Osaka (JP); Isamu Miyake, Osaka (JP)

(73) Assignee: Sharp Kabushiki Kaisha, Osaka (JP)

( * ) Notice: Subject to any disclaimer, the term of this patent is extended or adjusted under 35 U.S.C. 154(b) by 53 days.

(21) Appl. No.: 14/429,860

(22) PCT Filed: Sep. 9, 2013

(86) PCT No.: PCT/JP2013/074276
§ 371 (c)(1),
(2) Date: Mar. 20, 2015

(87) PCT Pub. No.: WO2014/045923
PCT Pub. Date: Mar. 27, 2014

(65) Prior Publication Data
US 2015/0234237 A1 Aug. 20, 2015

(30) Foreign Application Priority Data
Sep. 24, 2012 (JP) .................. 2012-210085

(51) Int. Cl.
*G02F 1/1337* (2006.01)
*G02F 1/1362* (2006.01)
*G02F 1/1339* (2006.01)

(52) U.S. Cl.
CPC ....... *G02F 1/133788* (2013.01); *G02F 1/1339* (2013.01); *G02F 1/1362* (2013.01); *G02F 1/133711* (2013.01)

(58) Field of Classification Search
CPC .............. G02F 1/133715; G02F 1/133788; G02F 1/133711; G02F 1/13775
See application file for complete search history.

(56) References Cited

U.S. PATENT DOCUMENTS

| | | |
|---|---|---|
| 6,177,972 B1 | 1/2001 | Held et al. |
| 2003/0086044 A1 | 5/2003 | Inoue et al. |
| 2005/0116200 A1 | 6/2005 | Nakanishi et al. |
| 2005/0136196 A1 | 6/2005 | Kataoka |
| 2005/0253988 A1 | 11/2005 | Inoue et al. |

(Continued)

FOREIGN PATENT DOCUMENTS

| | | |
|---|---|---|
| JP | 2004-286984 A | 10/2004 |
| JP | 2005-181582 A | 7/2005 |

(Continued)

OTHER PUBLICATIONS

Official Communication issued in International Patent Application No. PCT/JP2013/074276, mailed on Dec. 3, 2013.

(Continued)

*Primary Examiner* — Dennis Y Kim
(74) *Attorney, Agent, or Firm* — Keating & Bennett, LLP

(57) ABSTRACT

The present invention provides a liquid crystal display device that sufficiently reduces image sticking, by forming a polymer layer with stable alignment control appropriately. In a method for manufacturing the liquid crystal display device of the present invention, base film forming conditions are different between the step of forming a base film on a substrate including an active element and the step of forming a base film on a substrate different from the substrate including an active element.

8 Claims, 9 Drawing Sheets

(56) References Cited

U.S. PATENT DOCUMENTS

| | | | |
|---|---|---|---|
| 2009/0103011 A1 | 4/2009 | Bernatz et al. | |
| 2009/0141215 A1 | 6/2009 | Bremer et al. | |
| 2009/0324853 A1 | 12/2009 | Bernatz et al. | |
| 2011/0116027 A1* | 5/2011 | Sonoda | G02F 1/133788 349/123 |
| 2011/0128487 A1* | 6/2011 | Kim | G02F 1/133753 349/123 |
| 2011/0164213 A1* | 7/2011 | Nakanishi | C08L 79/08 349/129 |
| 2012/0212691 A1* | 8/2012 | Miyakawa | G02F 1/133788 349/86 |
| 2012/0212697 A1* | 8/2012 | Miyakawa | G02F 1/133711 349/123 |
| 2013/0196565 A1* | 8/2013 | Miyake | G02F 1/1337 445/25 |
| 2013/0222740 A1 | 8/2013 | Miyachi et al. | |
| 2013/0271713 A1 | 10/2013 | Miyake et al. | |

FOREIGN PATENT DOCUMENTS

| | | | | |
|---|---|---|---|---|
| JP | 2006-348227 A | 12/2006 | | |
| JP | 4175826 B2 | 11/2008 | | |
| JP | 4237977 B2 | 3/2009 | | |
| JP | 2009-102639 A | 5/2009 | | |
| JP | 2009-132718 A | 6/2009 | | |
| JP | 2010-033093 A | 2/2010 | | |
| JP | 2012-018215 A | 1/2012 | | |
| JP | WO 2012050177 A1 * | 4/2012 | ......... | C09K 19/0225 |
| WO | 2012/050177 A1 | 4/2012 | | |

OTHER PUBLICATIONS

Kikuchi et al., "Polymer-Stabilized Liquid Crystal Blue Phases," Nature Materials, vol. 1, Sep. 2002, pp. 64-68.

* cited by examiner

LIQUID CRYSTAL DISPLAY DEVICE AND METHOD FOR MANUFACTURING SAME

TECHNICAL FIELD

The present invention relates to a liquid crystal display device and a method for manufacturing the same. More specifically, the present invention relates to a liquid crystal display device that includes a polymer layer for characteristics improvement on a base film such as an alignment film, and a method for manufacturing the same.

BACKGROUND ART

Liquid crystal display devices, which achieve light weight, thin profile, and low power consumption, have been widely used as essential articles in daily life and business, such as mobile applications (e.g. smartphones, tablet terminals), various monitors, and large TV screens. Such liquid crystal display devices have been developed for further improving the display quality to achieve larger viewing angles and improved contrast, and for providing more functions.

Current liquid crystal display devices display images as follows. First, the alignment of liquid crystal molecules is controlled by applying an electric field to liquid crystal. The polarization of the light passing through the liquid crystal layer is thereby changed to adjust the amount of light passing through the polarizer.

The display performance of a liquid crystal display device is affected by the alignment state of liquid crystal molecules in an electric field applied and the size and direction of the electric field. Liquid crystal display devices can employ various display modes depending on the alignment state of liquid crystal molecules under no electric field and the direction of the electric field to be applied.

Examples of the display mode of a liquid crystal display device include a vertical alignment (VA) mode in which liquid crystal molecules having negative anisotropy of dielectric constant are aligned vertically to the substrate surface; and an in-plane switching (IPS) mode and a fringe field switching (FFS) mode in each of which liquid crystal molecules having positive or negative anisotropy of dielectric constant are aligned horizontally to the substrate surface and a transverse electric field is applied to the liquid crystal layer.

In particular, in multi-domain vertical alignment (MVA) mode which use liquid crystal molecules having negative anisotropy of dielectric constant and are provided with banks (ribs) and electrode-free parts (slits) as components for alignment control, the liquid crystal can be aligned in multiple directions under an electric field without a rubbing treatment to the alignment film. The mode thus achieve excellent viewing angle characteristics. In conventional MVA liquid crystal display devices, unfortunately, the boundaries of the divisions for the alignment of liquid crystal molecules may overlap with the upper parts of protrusions or slits, whereby the display devices may have reduced transmittance in a white display mode and may display dark lines on the screen. Thus, conventional MVA liquid crystal display devices still have room for improvement.

Alignment-stabilizing techniques using a polymer (hereinafter, also referred to as polymer sustained (PS) techniques) have been proposed as methods for manufacturing liquid crystal display devices with a high luminance and a high response speed (e.g. Patent Literature 1 to Patent Literature 8). Among these techniques, in a pre-tilt-angle-imparting technique using a polymer (hereinafter, also referred to as the polymer sustained alignment (PSA) technique), a liquid crystal composition containing a polymerizable component such as a polymerizable monomer or oligomer is sealed between substrates. The polymerizable component including the monomer is polymerized while the liquid crystal molecules are tilted (inclined) by a voltage applied across the substrates, thereby forming a polymer. This process allows the liquid crystal molecules to have a certain pre-tilt angle even after finishing voltage application, and can align the liquid crystal molecules in a certain direction.

Examples of other liquid crystal display elements including a polymerizable monomer include polymer-stabilized blue phase liquid crystal display elements (e.g. Non Patent Literature 1, Patent Literature 9).

Another example is a disclosure of a liquid crystal display element, in which a polymerizable monomer itself is proposed. The liquid crystal display element includes a pair of substrates to which voltage is applicable and which constitute a cell with a controlled gap, and a liquid crystal layer which is sandwiched between the pair of substrates and is to be driven by voltage application. The liquid crystal layer includes a liquid crystal composition (A) and a cured product. The liquid crystal composition (A) contains one or more kinds of liquid crystal molecules. The cured product is obtained by polymerizing one or more kinds of polymerizable compounds with energy line, heat, or a combination of these, and controls the inclination of the liquid crystal molecules. At least one of the polymerizable compounds contains two or more polymerizable functional groups in a molecule, and the two or more polymerizable functional groups are polymerizable compounds (A) which are at least two different kinds of functional groups (e.g. Patent Literature 10).

CITATION LIST

Patent Literature

Patent Literature 1: Japanese Patent No. 4175826
Patent Literature 2: Japanese Patent No. 4237977
Patent Literature 3: JP 2005-181582 A
Patent Literature 4: JP 2004-286984 A
Patent Literature 5: JP 2009-102639 A
Patent Literature 6: JP 2009-132718 A
Patent Literature 7: JP 2010-33093 A
Patent Literature 8: U.S. Pat. No. 6,177,972
Patent Literature 9: JP 2006-348227 A
Patent Literature 10: JP 2012-18215 A

Non Patent Literature

Non Patent Literature 1: H. Kikuchi, et al., Nature Materials, 1, 64-68, 2002

SUMMARY OF INVENTION

Technical Problem

One of techniques for aligning liquid crystal is a photoalignment technique, in which a photoactive material is used to form an alignment film and the alignment film is irradiated with light such as ultraviolet light to allow the film to have alignment control. This technique, which enables an alignment treatment without touching the film surface, can prevent contamination such as stains and dirt in the alignment treatment. This technique thus can be applied to large panels, unlike in the case of a rubbing treatment. Studies have been conducted for applying this photoalignment technique to liquid crystal display devices of a VA mode, an IPS mode, and the like mode, for mass production of liquid crystal display devices.

The inventors of the present invention found that this photoalignment technique may cause severe image sticking in liquid crystal displays particularly in the case of using horizontal alignment films that align liquid crystal molecules in a horizontal direction. Liquid crystal display devices that display a large number of still images (e.g. monitors) are especially desired to have reduced image sticking.

Image sticking is caused as follows. If a voltage is continuously applied to part of a liquid crystal cell, liquid crystal molecules are kept aligned in the angle and direction controlled by a voltage along the substrate surface even after finishing the voltage application (i.e. image sticking is caused because liquid crystal molecules memorize the alignment direction along the substrate surface). Image sticking is affected by the presence or absence and forming conditions of a polymer layer.

The above mentioned Patent Literature 10 discloses a liquid crystal display that improves reduction of image sticking characteristics and the stability of pre-tilt angles by using liquid crystal containing a polymerizable compound (e.g. Table 3 in Patent Literature 10 discloses that liquid crystal molecules are tilted at a certain pre-tilt angle by polymerizing a disclosed polymerizable compound). Patent Literature 10, however, makes no disclosure about alignment films and reduction of image sticking by preventing liquid crystal molecules from aligning in the angle and direction controlled by a voltage along the substrate surface after finishing the voltage application. Simple methods for further reducing image sticking have been desired.

FIG. 2 is a photograph showing image sticking of a liquid crystal cell produced by the inventors of the present invention through a photoalignment treatment. FIG. 2 indicates that brightness is significantly different between a region X to which an alternating voltage (AC voltage) is applied and a region Y to which no alternating voltage (AC voltage) is applied, and that the region X has severe image sticking.

The present invention has been made under the above situation and aims to provide a liquid crystal display device that sufficiently reduces image sticking, by using an appropriately formed polymer layer with stable alignment control.

Solution to Problem

In production of an IPS or the like liquid crystal cell through a photoalignment treatment, the inventors of the present invention studied a polymer stabilization (PS) step in which a polymerizable monomer is added to liquid crystal and polymerized under heat or light to form a polymer layer on the substrate surface forming an interface with a liquid crystal layer. The inventors thereby succeeded in forming a stable polymer by the PS technique and found that it is important to promote polymerization reaction for the PS technique (hereinafter, also referred to as PS polymerization) for solving the above problem.

The inventors of the present invention further studied an improved solution for the above problem so that the solution could be applied to applications that display a large number of still images (e.g. applications such as monitors). The inventors thereby found, in a liquid crystal display device that includes a base film and a polymer layer on both substrates, a method of changing base film forming conditions between the step of forming a base film on a substrate including an active element and the step of forming a base film on a substrate different from the substrate including an active element.

Changing base film forming conditions for forming a film (e.g. photoalignment film) between a pair of substrates easily provides different polymer layers on the pair of substrates. Specifically, in formation of base films such as photoalignment films on substrates, conditions (e.g. the baking time and temperature for forming base films, the thickness of base films) are changed between a substrate including an active element (e.g. comb electrode substrate) and a counter substrate (e.g. bare glass substrate). Polymer layers to be formed are thus different between the substrate including an active element and the counter substrate. Thereby, a resulting polymer layer for reducing image sticking can have an appropriately controlled thickness and/or density and can be efficiently formed on the substrate including an active element. Thus, the above problem has been finely solved and the present invention was thereby completed.

In other words, one aspect of the present invention may be a method for manufacturing a liquid crystal display device including a liquid crystal cell that includes a pair of substrates that consists of a substrate including an active element and a substrate different from the substrate including an active element, and a liquid crystal layer sandwiched between the pair of substrates, the method including the steps of: forming a base film from a photoactive material on the substrate including an active element; forming a base film from a photoactive material on the substrate different from the substrate including an active element; bonding both substrates together; and forming a polymer layer for controlling the alignment of nearby liquid crystal molecules by polymerizing a monomer, on a liquid crystal layer side of the base film of each substrate, wherein base film forming conditions are different between the step of forming a base film on the substrate including an active element and the step of forming a base film on the substrate different from the substrate including an active element.

In the step of forming a base film on the substrate including an active element and in the step of forming a base film on the substrate different from the substrate including an active element, preferably, a photoactive material is applied to each substrate and baked to form each base film. The baking time of the photoactive material is preferably longer in the step of forming a base film on the substrate including an active element than in the step of forming a base film on the substrate different from the substrate including an active element.

The time for leaving the substrate including an active element in the air between the step of forming a base film on the substrate including an active element and the step of bonding both substrates together is preferably longer than the time for leaving the substrate different from the substrate including an active element in the air between the step of forming a base film on the substrate different from the substrate including an active element and the step of bonding both substrates together.

The step of forming a base film on the substrate including an active element preferably provides a base film with a smaller thickness than the step of forming a base film on the substrate different from the substrate including an active element.

The step of forming a polymer layer preferably forms a polymer layer having a larger thickness, a higher density, or both of these on a liquid crystal layer side of the substrate including an active element than on a liquid crystal layer side of the substrate different from the substrate including an active element.

In the step of forming a polymer layer, the monomer added to the liquid crystal layer is preferably polymerized to form a polymer layer.

The monomer preferably contains at least one selected from the group consisting of acrylate, methacrylate, vinyl, vinyloxy, and epoxy groups.

In the step of forming a polymer layer, the monomer is preferably photopolymerized to form a polymer layer.

In the step of forming a polymer layer, the monomer is preferably polymerized under ultraviolet light, visible light, or both kinds of light to form a polymer layer.

Each base film is preferably a photoalignment film formed through a photoalignment treatment under ultraviolet light, visible light, or both kinds of light.

Each base film is preferably a photoalignment film formed through a photoalignment treatment under linearly polarized light.

Another aspect of the present invention may be a liquid crystal display device including a liquid crystal cell that includes a pair of substrates and a liquid crystal layer sandwiched between the pair of substrates, the pair of substrates consisting of a substrate including an active element, and a counter substrate facing to the substrate, the substrate including an active element including a base film that is formed on a liquid crystal layer side and a polymer layer that is formed on a liquid crystal layer side of the base film and controls the alignment of nearby liquid crystal molecules, the counter substrate including a base film that is formed on a liquid crystal layer side, and a polymer layer that is formed on a liquid crystal layer side of the base film and controls the alignment of nearby liquid crystal molecules, the base film of the substrate including an active element and the base film of the counter substrate each being formed of a photoactive material, the polymer layer of the substrate including an active element and the polymer layer of the counter substrate each being formed by polymerizing a monomer, the polymer layer of the substrate including an active element having a larger thickness, a higher density, or both of these than the polymer layer of the counter substrate.

In comparison with prior techniques, the liquid crystal display device of the present invention and the method for manufacturing a liquid crystal display device of the present invention have a common technical concept that the polymer layers of both substrates can be differently formed to achieve the effects of the present invention.

In the liquid crystal display device of the present invention, liquid crystal molecules on an active matrix substrate side preferably more elastically deform than liquid crystal molecules on a counter substrate side when a voltage applied to the liquid crystal layer is equal to or higher than a threshold voltage.

The base film of the substrate including an active element and the base film of the counter substrate each are preferably a horizontal alignment film that aligns nearby liquid crystal molecules substantially horizontally to a surface of each base film.

The substrate including an active element preferably includes a pixel electrode and a common electrode.

The liquid crystal layer preferably generates a transverse electric field on a side of the substrate including an active element.

The base film of the substrate including an active element preferably has a smaller thickness than the base film of the counter substrate.

The base film of the substrate including an active element and the base film of the counter substrate each preferably contain a compound that contains at least one selected from the group consisting of photoisomerizable functional groups, photocrosslinkable functional groups, and photodecomposable functional groups.

The liquid crystal layer preferably contains liquid crystal molecules that contain a double bond other than conjugated double bonds of a benzene ring, in a molecular structure.

The double bond is preferably contained in an alkenyl group.

The alignment mode of the liquid crystal layer is preferably an IPS mode, an FFS mode, or a blue phase mode.

Preferred embodiments of the liquid crystal display device manufactured by the method for manufacturing a liquid crystal display device of the present invention are the same as the preferred embodiments of the liquid crystal display device of the present invention.

The configurations of the liquid crystal display device and the method for manufacturing the liquid crystal display device of the present invention are not especially limited by other components as long as they essentially include the above mentioned components. An embodiment in which two or more preferred embodiments described below are employed in combination is also a preferred embodiment of the present invention.

Advantageous Effects of Invention

The present invention provides a liquid crystal display device that sufficiently reduces image sticking, by using an appropriately formed polymer layer with stable alignment control.

DESCRIPTION OF EMBODIMENTS

Figure 1:
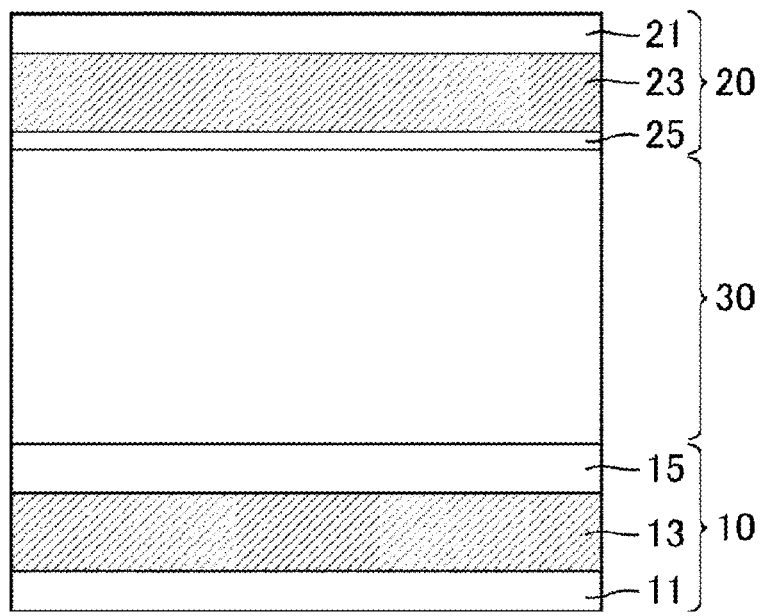
FIG. 1 is a schematic cross-sectional view of a liquid crystal cell of Example 1.

The present invention will be mentioned in more detail in the embodiments below referring to the drawings, but is not limited to these embodiments. Image sticking refers to a phenomenon in which, after continuous voltage application to part of a liquid crystal cell, the part with a voltage and other part without voltage have different brightness when the display pattern is changed. A "bare glass substrate" refers to a term for distinguishing the substrate from the comb electrode substrate that includes a pair of comb electrodes, and includes an alignment film and a polymer layer on the liquid crystal layer side. The threshold voltage of the voltage applied to a liquid crystal layer means, for example, a voltage that gives a transmittance of 0.5% when the transmittance in the bright state is defined as 100%.

Embodiment 1

A liquid crystal display device of Embodiment 1 includes a liquid crystal cell in which the polymer layer of a substrate including an active element has a larger thickness, a higher density, or both of these than the polymer layer of a counter substrate. In Embodiment 1, the base film of the substrate including an active element is formed under film forming conditions different from those for the base film of the substrate different from the substrate including an active element. Specifically, the baking time of the base film of the substrate including an active element is longer than that of the counter substrate. For example, the base film of the counter substrate is preferably formed by baking a photoactive material for 20 to 60 minutes while the base film of the substrate including an active element is preferably formed by baking a photoactive material for 70 to 200 minutes. The difference in the baking time of the base film between the substrate including an active element and the counter substrate is, for example, preferably 30 minutes or longer, more preferably 40 minutes or longer. The upper limit of the difference is preferably 200 minutes or shorter, for example. The baking temperature may range from 210° C. to 250° C., for example. Thereby, the polymer layer on the base film of the substrate including an active element may have a larger thickness, a higher density, or both of these than the polymer layer on the base film of the counter substrate. This configuration achieves better effects of reducing image sticking than conventional PS techniques without increasing the amount of a polymerizable additive to be added to liquid crystal or increasing the irradiation amount of ultraviolet light for promoting the reaction of the additive. Image sticking can be finely reduced by, for example, forming a thicker polymer layer on the side of a substrate where liquid crystal molecules more elastically deform at a voltage equal to or higher than the threshold voltage applied to the liquid crystal layer. In particular, the polymer layer of the substrate including an active element preferably has a larger thickness than the polymer layer of the counter substrate.

The following describes the liquid crystal display device of Embodiment 1. The liquid crystal display device of Embodiment 1 includes a pair of substrates consisting of a substrate including an active element and a counter substrate facing to the substrate including an active element, and a liquid crystal layer sandwiched between the pair of substrates. The substrate including an active element is usually an active matrix substrate. The substrate including an active element includes a transparent insulating substrate made of a material such as glass or resin, and, on the liquid crystal layer side of the transparent substrate, various wires, pixel electrodes (e.g. comb electrode), TFTs, and the like. The substrate including an active element preferably includes pixel electrodes and a common electrode, for example. The liquid crystal layer preferably generates a transverse electric field on the side of the substrate including an active element. The counter substrate includes a transparent insulating substrate made of a material such as glass, and, on the liquid crystal layer side of the transparent substrate, color filters, a black matrix, a common electrode, and the like. In modes such as an IPS mode and an FFS mode, electrodes are formed only on the substrate including an active element. In other modes, electrodes may be formed on both of the substrate including an active element and the counter substrate according to need. In an IPS mode, pixel electrodes and a common electrode form a pair of comb electrodes and are arranged in a manner that the teeth of both comb electrodes are engaged with each other on the same level. In an FFS mode, one of pixel electrodes and a common electrode is a comb electrode or an electrode with slits, and the other is a plate electrode (planar electrode without apertures). The pixel electrode and the common electrode are disposed in different levels separated by an insulating layer. The pixel electrode and the common electrode are preferably transparent electrodes. If one of the pair of substrates includes color filters, for example, the below mentioned ultraviolet irradiation for polymerizing a monomer needs to be performed from the side of the other substrate without a color filter. Thus, the other substrate preferably has a transparent electrode to achieve efficient polymerization of the monomer. Examples of the electrode material include translucent materials such as indium tin oxide (ITO) and indium zinc oxide (IZO).

The substrate including an active element includes pixel electrodes, an alignment film as a base film that is formed on the liquid crystal layer side of the pixel electrodes, a polymer layer that is formed on the liquid crystal layer side of the alignment film and controls the alignment of nearby liquid crystal molecules. The counter substrate also includes an alignment film as a base film and a polymer layer that is formed on the liquid crystal layer side of the alignment film and controls the alignment of nearby liquid crystal molecules. Each base film of the present invention may be an alignment film capable of aligning nearby liquid crystal molecules in a certain direction or a film that is formed without an alignment treatment and has no such alignment capability. The base film is preferably, for example, a horizontal alignment film that aligns nearby liquid crystal molecules substantially horizontally to a surface of the base film.

The substrate including an active element includes an alignment film (base film), and the counter substrate also includes an alignment film (base film). Each alignment film is formed from polyimide, polyamide, polyvinyl, polysiloxane, or the like as a main component. The alignment film can align liquid crystal molecules in a certain direction. The alignment film is preferably formed from a photoactive material. For example, materials containing a compound that contains a photoactive functional group are suitably used.

If a photoactive material is used as the base film material, the base film material is excited by photopolymerization of a monomer as mentioned below, for example. The excitation causes a transfer of excited energy or radical to a monomer, and thereby improves the reactivity for polymer layer formation. In addition, irradiating the base film with light under predetermined conditions allows a photoalignment treatment that gives an alignment capability. Hereinafter, a polymer film that is given a capability of controlling the alignment of liquid crystal by a photoalignment treatment is also referred to as a photoalignment film.

Examples of the photoactive material include photochromic compound materials, dye materials, fluorescent materials, phosphorescent materials, and materials for photoalignment films. These photoactive materials more preferably include at least one chemical structure selected from the group consisting of terphenyl derivatives, naphthalene derivatives, phenanthrene derivatives, tetracene derivatives, spiropyran derivatives, spiro pyrimidine derivatives, viologen derivatives, diarylethene derivatives, anthraquinone derivatives, azobenzene derivatives, cinnamoyl derivatives, chalcone derivatives, cinnamate derivatives, coumarin derivatives, stilbene derivatives, and anthracene derivatives. The benzene rings contained in these derivatives may be heterocyclic rings. The term "derivative" herein means a compound in which an atom or functional group is substituted with a specific atom or functional group, or a compound in which a functional group is incorporated into a molecular structure as a monovalent or higher valent functional group. The derivatives may be in the molecular structure of the main chain of a polymer or in the molecular structure of the side chain of a polymer, and may be a monomer or an oligomer. If the base film material contains such a monomer or oligomer that contains a photoactive functional group (preferably in an amount of 3 mass % or more), the polymer for forming a base film itself may be photo-inactive. The polymer for forming a base film is preferably a polysiloxane, a polyamide acid, or a polyimide in terms of heat resistance. The polymer for forming a base film may include a cyclobutane skeleton.

The photoactive material is more preferably a material for photoalignment films. A photoalignment film is a polymer film that causes anisotropy under irradiation with polarized or unpolarized light and controls the alignment of liquid crystal. The material for photoalignment films may be a single polymer or a mixture of a single polymer with other molecules as long as the material has the above characteristics. Examples thereof include a material that contains a photoalignable functional group-containing polymer and a low molecule (e.g. additive) or a photo-inactive polymer; and a material that contains a photo-inactive polymer and an additive with a photoalignable functional group. The materials for photoalignment films are preferably materials which may cause a photolytic reaction, a photoisomerization reaction, or a photodimerization reaction. A photoisomerization reaction and a photodimerization reaction generally enable alignment under light at a longer wavelength and a lower irradiation amount than a photolytic reaction, and are thus suitable for mass production. Typical materials for causing a photolytic reaction include materials that contain a compound with a cyclobutane skeleton.

The material for forming a photoalignment film preferably contains a photoisomerizable functional group, a photodimerizable functional group, or both of these functional groups. Typical materials that cause a photoisomerization reaction or a photodimerization reaction include azobenzene derivatives, cinnamoyl derivatives, chalcone derivatives, cinnamate derivatives, coumarin derivatives, diarylethene derivatives, stilbene derivatives, and anthracene derivatives.

The photoisomerizable or photodimerizable functional group is more preferably a cinnamate group or a derivative thereof. These functional groups particularly have excellent reactivity. The benzene rings contained in these functional groups may be heterocyclic rings.

The base film is preferably a photoalignment film formed through a photoalignment treatment under ultraviolet light, visible light, or both kinds of light. Because a polymer layer is formed to fix the alignment, it is not necessary to prevent ultraviolet light or visible light from penetrating into the liquid crystal layer after the production step. This increases options in the production step. The base film is preferably a photoalignment film formed through a photoalignment treatment under polarized or unpolarized light. The pre-tilt angle of liquid crystal molecules given by the photoalignment film may be adjusted by the kind, irradiation time, and irradiation intensity of light, the kind of the photofunctional group, and the like.

If the base film is formed through a photoalignment treatment and the polymer layer is formed through photopolymerization, these are preferably formed at once under the same light. This achieves efficient production of liquid crystal display devices.

The liquid crystal layer preferably contains a polymerizable monomer before the PS polymerization step. The polymerizable monomer initiates polymerization in the PS polymerization step and is formed into a polymer layer on the alignment film to allow the alignment film to have improved alignment control. The polymerizable monomer may be a mixture of multiple monomers.

The polymer layer may be formed by injecting a liquid crystal composition that contains a liquid crystal material and a polymerizable monomer between the substrate including an active element and the counter substrate, and irradiating the liquid crystal layer with a certain amount of light or heating the liquid crystal layer to polymerize the polymerizable monomer. Here, the polymerization is performed when a voltage applied to the liquid crystal layer is equal to or higher than a threshold voltage. The resulting polymer layer thereby has a shape which is along the initial tilt of liquid crystal molecules and can thus have more stable alignment. The liquid crystal composition may optionally contain a polymerization initiator.

The polymer layer may be formed by polymerization of a monomer mixed with the material for forming a photoalignment film, and/or polymerization of a monomer applied to a photoalignment film.

The polymerizable functional group in the monomer for forming the polymer layer is preferably an acrylate, methacrylate, vinyl, vinyloxy, or epoxy group. In other words, the polymer layer preferably contains a monomer unit derived from a monomer that contains at least one selected from the group consisting of acrylate, methacrylate, vinyl, vinyloxy, and epoxy groups. Acrylate and methacrylate groups are particularly preferred. Acrylate and methacrylate groups achieve high radical generation ratio and thus are effective for achieving short takt time in production. The monomer is preferably one which may initiate a polymerization reaction under light irradiation (i.e. photopolymerization) or under heat (i.e. thermal polymerization).

In other words, the polymer layer is preferably formed by photopolymerization or thermal polymerization. Photopolymerization, which easily initiates a polymerization reaction at normal temperature, is particularly preferred. The light for the photopolymerization is preferably ultraviolet light, visible light, or both kinds of light. The photopolymerization is preferably performed under unpolarized or linearly polarized light. Photopolymerization under unpolarized light does not require a member such as a polarizer and thus enables exposure to light with a simpler apparatus. The liquid crystal device can thereby be more easily manufactured. In addition, unpolarized light has a higher illuminance and thus can achieve short takt time. Unfortunately, in the case of, for example, using a photoalignment film formed through an alignment treatment, photopolymerization under unpolarized light deteriorates the alignment quality of the photoalignment film and thereby slightly reduces contrast. In contrast, photopolymerization under linearly polarized light can keep the alignment quality of such a photoalignment film to enhance the alignment of the polymer, thereby improving contrast. Therefore, use of unpolarized light or linearly polarized light should be appropriately selected.

The monomer preferably contains two or more polymerizable functional groups. A larger number of polymerizable functional groups enhance reaction efficiency and thus achieve photopolymerization in a shorter time. However, too many polymerizable functional groups contained in the monomer increase the molecular weight and cause poor solubility in the liquid crystal. Thus, the monomer more preferably contains four or less polymerizable functional groups.

Examples of the polymerization reaction for forming the polymer layer of the present invention are not particularly limited and include sequential polymerization in which bifunctional monomers form new bonds and gradually increase the molecular weight, and chain polymerization in which a monomer bonds with an active species generated from a small amount of catalyst (e.g. initiator) in turn and the bonds rapidly grow. Examples of the sequential polymerization include polycondensation and polyaddition. Examples of the chain polymerization include radical polymerization and ionic polymerization (e.g. anionic polymerization, cationic polymerization).

The polymer layer, which is formed on a base film formed through an alignment treatment, namely, on an alignment film, can improve the alignment control of the alignment film. As mentioned above, the polymer layer on the base film of the substrate including an active element is designed to have a larger thickness, a higher density, or both of these than the polymer layer on the base film of the counter substrate. Such a design can significantly reduce image sticking of display and remarkably improve the display quality. If the monomer is polymerized in a manner that the liquid crystal molecules are tilted at a certain pre-tilt angle at a voltage equal to or higher than the threshold voltage, to form the polymer layer, the resulting polymer layer allows liquid crystal molecules to have pre-tilt angles.

The concentration of the monomer added to the liquid crystal layer is preferably 0.15 mass % or higher in the whole composition forming the liquid crystal layer. The concentration is more preferably 0.2 mass % or higher. According to the studies of the inventors of the present invention, as mentioned below, a monomer concentration of lower than 0.15 mass % reduces the effect of reducing image sticking in the PS step, and a concentration of 0.15 mass % or higher, more preferably 0.2 mass % or higher, can reduce image sticking better. If the monomer contains multiple kinds of monomers, the concentration of the monomer is calculated as the concentration of the total amount of the monomers.

The concentration of the monomer added to the liquid crystal layer is preferably 0.6 mass % or lower in the whole composition forming the liquid crystal layer. This concentration enables a sufficiently excellent contrast ratio. If the monomer contains multiple kinds of monomers, the concentration of the monomer is calculated as the concentration of the total amount of the monomers.

The base film is preferably a horizontal alignment film that aligns nearby liquid crystal molecules substantially horizontally to a surface of the base film. The horizontal alignment film achieves more efficient delivery of excitation energy from the alignment film to the monomer under light irradiation on the photoactive material than in the case of a vertical alignment film, and thus can allow formation of a more stable polymer layer. Accordingly, the PS step is preferably performed to the alignment film that is a horizontal alignment film formed from a photoactive material. This can remarkably improve the delivery of the excitation energy and significantly reduce image sticking. Thus, suitable examples of the alignment mode of the liquid crystal layer include modes in which the horizontal alignment film can be used, such as an IPS mode, an FFS mode, an optically compensated bend (OCB) mode, a twisted nematic (TN) mode, a super twisted nematic (STN) mode, a ferroelectric liquid crystals (FLC) mode, a polymer dispersed liquid crystal (PDLC) mode, and a polymer network liquid crystal (PNLC) mode. A blue phase mode that does not require formation of an alignment film is also suitable. Preferred examples include an IPS mode, an FFS mode, and a blue phase mode.

The excitation energy may not be necessarily delivered from the alignment film to the polymerizable monomer by photoisomerization and photocrosslinking which are mechanisms of photoalignment. The excitation energy may be delivered by any technique which causes photoexcitation.

The above alignment modes are also suitable for an embodiment which has a multi-domain structure on at least one of the pair of substrates, for improving viewing angle characteristics. A multi-domain structure includes multiple regions in each of which liquid crystal molecules are aligned in an alignment mode (e.g. bend alignment in an optically compensated bend (OCB) mode, twisted alignment in TN and STN modes) different from other multiple regions or in a direction different from other multiple regions in spite of the presence or absence of voltage application. A multi-domain structure needs to be formed by purposefully patterning an electrode into an appropriate shape, using an article such as a photomask in light irradiation of the photoactive material, or both of these ways.

At least one of the pair of substrates may further contain a flattening layer that flattens the substrate surface. Formation of the flattening layer can smooth the roughness of the lower layer and eliminate the thickness difference on the lower layer, to contribute to improvement in the contrast ratio. If the flattening layer is formed on a substrate including an electrode, it is usually formed under the electrode (on the side not having the liquid crystal layer).

The liquid crystal layer is filled with a liquid crystal material that aligns in a certain direction at a certain voltage. The alignment of the liquid crystal molecules in the liquid crystal layer is controlled by application of a voltage equal to or higher than the threshold voltage.

The liquid crystal layer includes liquid crystal molecules that include a multiple bond other than conjugated double bonds of a benzene ring, in a molecular structure. The liquid crystal molecules may have positive anisotropy of dielectric constant (positive liquid crystal molecules) or negative anisotropy of dielectric constant (negative liquid crystal molecules). The liquid crystal molecules are preferably nematic liquid crystal molecules that have high symmetry in the liquid crystal layer. Examples of the skeleton of the liquid crystal molecules include a skeleton in which two ring structures and a group bonded to the ring structures are linearly connected.

The multiple bond does not include conjugated double bonds of a benzene ring because benzene rings have poor reactivity. The liquid crystal molecules in the present invention may contain a conjugated double bond of a benzene ring if they essentially include a multiple bond other than the conjugated double bond of a benzene ring. Thus, the conjugated double bonds of a benzene ring are not necessarily excluded. The liquid crystal molecules of the liquid crystal layer in the present invention may be a mixture of multiple kinds of liquid crystal molecules. A mixture of multiple kinds of liquid crystal molecules may be used for the liquid crystal material for achieving reliability, improving the response speed, and adjusting the temperature region of the liquid crystal phase, the elastic constant, the anisotropy of dielectric constant, and the refractive index anisotropy.

The multiple bond is preferably a double bond, and is preferably contained in an ester or alkenyl group. A double bond has more excellent reactivity than a triple bond. The multiple bond may be a triple bond. In the case of a triple bond, the triple bond is preferably contained in a cyano group. The liquid crystal molecules preferably contain two or more multiple bonds.

The liquid crystal display device of Embodiment 1 includes a linear polarizer disposed on the back side (the side not having the liquid crystal layer) of the substrate including an active element and on the observation side (the side not having the liquid crystal layer) of the counter substrate. Each linear polarizer may be equipped with a retarder to form a circular polarizer.

The liquid crystal display device of Embodiment 1 may be a transmission type, reflective type, or transreflective type liquid crystal display device. A transmission type or transreflective type liquid crystal display device of Embodiment 1 further includes a backlight. The backlight is disposed on the back side of the liquid crystal cell such that light passes through the substrate including an active element, the liquid crystal layer, and the counter substrate in this order. A reflective type or transreflective type liquid crystal display device includes a reflector that reflects external light on the substrate including an active element. In addition, the polarizer of the counter substrate needs to be a circular polarizer at least in the region where reflected light is used for display.

The liquid crystal display device of Embodiment 1 may be a monochrome display or a field sequential color display. Such display devices do not need a color filter.

The liquid crystal display device of Embodiment 1 includes a liquid crystal cell and may be suitably used for TV panels, digital signage displays, medical monitors, electronic book readers, monitors for PCs, and panels for mobile terminals. IPS-mode or FFS-mode liquid crystal panels, which have fine viewing angle characteristics, may be suitably used for displays that display a large number of still images, such as monitors and digital signage displays.

The components in the alignment film and the components of the monomer in the polymer layer in the liquid crystal display device of Embodiment 1 may be analyzed by decomposing the liquid crystal display device and then chemically analyzing by gas chromatograph mass spectrometry (GC-MS), time-of-fright secondary ion mass spectrometry (TOF-SIMS), or the like technique. The cross-sectional shape of the liquid crystal cell that includes the alignment film and the polymer layer may be observed with a microscope such as a scanning transmission electron microscope (STEM) or a scanning electron microscope (SEM). The following describes examples of an actually produced liquid crystal cell to be installed in the liquid crystal display device of Embodiment 1.

EXAMPLES

Example 1

FIG. 1 is a schematic cross-sectional view of a liquid crystal cell of Example 1.

As illustrated in FIG. 1, the liquid crystal cell of Example 1 includes a comb electrode substrate 10 as a substrate including an active element, a bare glass substrate 20 as a counter substrate facing to the comb electrode substrate 10, and a liquid crystal layer 30 sandwiched between a pair of substrates consisting of the comb electrode substrate 10 and the bare glass substrate 20. The comb electrode substrate 10 includes a transparent insulating substrate 11 made of glass, and, on the liquid crystal layer side of the transparent substrate 11, various wires, a pair of comb electrodes including pixel electrodes and a common electrode, and TFTs. The bare glass substrate 20 includes a transparent insulating substrate 21 made of a material such as glass, and, on the liquid crystal layer side of the transparent substrate 21, color filters and a black matrix.

In Example 1, a glass substrate including a pair of comb electrodes (transparent electrodes) on the surface (hereinafter, also referred to as a comb electrode substrate as a whole) and a bare glass substrate (counter substrate) were prepared. A polyvinyl cinnamate solution, which is a material of a horizontal alignment film, was applied to both substrates by the spin coating method. In the pair of comb electrodes, the common electrode and the pixel electrodes extend substantially parallel to each other and are each formed in a zigzag shape. Thereby, the electric field vector under application of an electric field crosses the length direction of the electrodes at substantially right angles. Thus, a multi-domain structure was formed to achieve fine viewing angle characteristics. The comb electrode was made of IZO. The electrode width L of the comb electrodes was set to 3 µm, and the distance S between the electrodes was set to 9 µm. The polyvinyl cinnamate solution was formed by preparing a solvent that contains the same amounts of N-methyl-2-pyrrolidone and ethylene glycol monobutyl ether and dissolving polyvinyl cinnamate (3 mass % in the whole solution) in the solvent.

The polyvinyl cinnamate solution was applied to the substrates by the spin coating method and temporarily dried at 90° C. for 1 minute. Then, the bare glass substrate was baked at 230° C. for 40 minutes under nitrogen purge to form an alignment film 23, and the glass substrate with the pair of comb electrodes was baked at 230° C. for 90 minutes to form an alignment film 13. The alignment films 13 and 23 each had a film thickness of 100 nm.

The surface of each substrate was subjected to a liquid crystal alignment treatment, namely, was irradiated with linearly polarized ultraviolet light having a wavelength of 313 nm at a amount of 5 J/cm$^2$ from the normal direction of each substrate. The angle made by the length direction of the comb electrode and the polarized light direction was 15°. Thereby, the liquid crystal molecules were aligned to cross the polarized direction of polarized ultraviolet light at substantially right angles under no voltage application, and were aligned to cross the length direction of the comb electrode at substantially right angles at a voltage equal to or higher than the threshold voltage applied.

Next, a thermosetting seal material (HC1413EP, from Mitsui Chemicals, Inc.) was screen-printed on the comb electrode substrate. Furthermore, 3.5 μm-diameter beads (PF-35S, from Nippon Electric Glass Co., Ltd.) were spread on the bare glass substrate such that the resulting liquid crystal layer had a thickness of 3.5 μm. These two substrates were then arranged and bonded together in a manner that the polarized directions of the irradiated ultraviolet light of the substrates were the same and the alignment films were faced inside.

Next, the bonded substrates were heated in a nitrogen-purged furnace at a temperature of 130° C. and a pressure of 0.5 kgf/cm$^2$ for 60 minutes to harden the seal.

A liquid crystal composition containing a liquid crystal material and a monomer was injected into the resulting cell under vacuum. The liquid crystal material contained 100 mass % of a commercially available liquid crystal material (MLC6610, from Merck Ltd., Japan) and 5 mass % of liquid crystal molecules (trans-4-propyl-4'-vinyl-1,1'-bicyclohexane). The monomer (liquid crystal additive) contained 0.3 mass % of a polymerizable additive (biphenyl-4,4'-diylbis(2-methyl acrylate)).

The inlet of the cell, from which the liquid crystal composition was injected, was sealed with an ultraviolet-curable resin (TB3026E, from Three Bond Fine Chemical Co., Ltd.) under ultraviolet irradiation. The irradiated ultraviolet light for sealing had a wavelength of 365 nm. During sealing, the pixel region was light-shielded to eliminate the effects of ultraviolet light as much as possible. Then, the electrodes were short-circuited and the surface of the glass substrate was electrically neutralized, to prevent the alignment of the liquid crystal from being disturbed by the external field.

Next, to eliminate the flow alignment of the liquid crystal molecules, the liquid crystal cell was heated at 130° C. for 40 minutes, whereby the liquid crystal molecules in the liquid crystal layer were re-aligned to have an isotropic phase. The resulting cell thereby included liquid crystal molecules that were uniaxially aligned along the substrate surface at a right angle to the polarized direction of the ultraviolet light irradiated to the alignment film.

Next, the liquid crystal cell was irradiated with unpolarized ultraviolet light at an amount of 0.3 J/cm$^2$ with a black light (FHF32BLB, from TOSHIBA CORPORATION), to perform a PS treatment. This treatment initiated polymerization of biphenyl-4,4'-diylbis(2-methyl acrylate) which is a liquid crystal additive. Thereby, polymer layers 15 and 25 were obtained. The resulting polymer layer 15 of the comb electrode substrate 10 had a larger thickness, a higher density, or both of these than the simultaneously obtained polymer layer 25 of the bare glass substrate 20. Through the above steps, an IPS cell was produced through the PS treatment and evaluated for image sticking as mentioned below.

Figure 2:
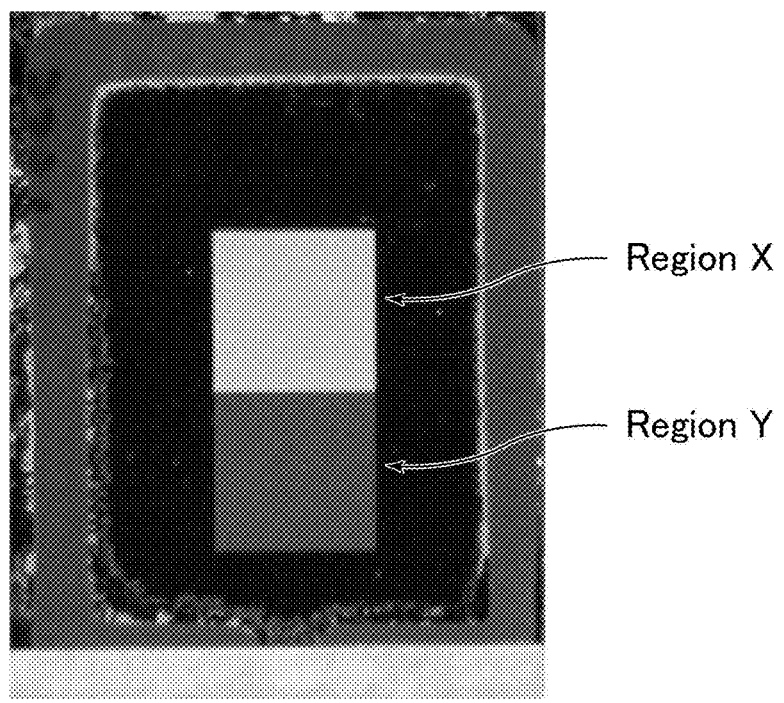
FIG. 2 is a photograph showing image sticking of a liquid crystal cell formed through a photoalignment treatment.

FIG. 2 is a photograph showing image sticking of a liquid crystal cell formed through a photoalignment treatment.

Image sticking in the liquid crystal cell was evaluated as below.

Region X and region Y were formed in the cell so that two different voltages could be applied to the respective regions. An alternating current (AC) voltage with a square wave of 6 V at 30 Hz was applied to the region X while no AC voltage was applied to the region Y (no electricity was applied). Six hours later, an alternating current voltage with a square wave of 2 V at 30 Hz was applied to the two regions X and Y, and the brightness T(x) of the region X and the brightness T(y) of the region Y were determined. ΔT (x,y) (%), which is used as an image sticking index, is represented by the following formula: $\Delta T(x,y)=(|T(x)-T(y)|/T(y))\times 100$.

Comparative Example 1

Figure 3:
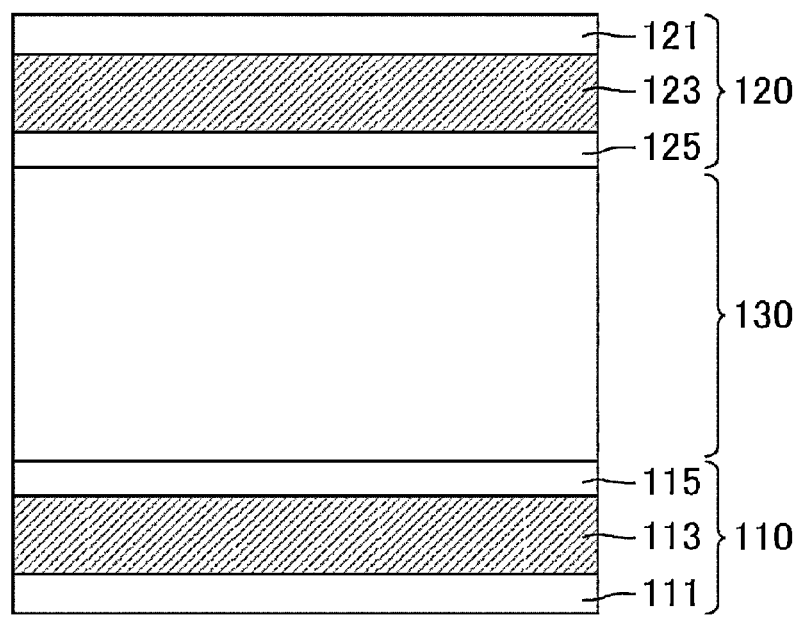
FIG. 3 is a schematic cross-sectional view of a liquid crystal cell of Comparative Example 1.

FIG. 3 is a schematic cross-sectional view of a liquid crystal cell of Comparative Example 1.

The IPS mode liquid crystal cell of Comparative Example 1 was produced in the same manner as in Example 1 except that alignment films 113 and 123 were formed on the comb electrode substrate side and on the bare glass substrate side, respectively, under the same baking conditions at 230° C. for 40 minutes. A resulting polymer layer 115 of a comb electrode substrate 110 had a thickness and density comparable to those of a simultaneously obtained polymer layer 125 of a bare glass substrate 120.

According to general knowledge, a long baking time for forming an alignment film causes decomposition of bonds by heat. The decomposition deteriorates the alignment film, which presumably inhibits formation of a polymer layer to cause severe image sticking. In contrast to the general knowledge, the present invention succeeded in reducing image sticking.

If the baking time for forming an alignment film is the same between the comb electrode substrate and the bare glass substrate, the amount of the polymerizable monomer, which is excited by light irradiation and transfers to the interfaces after polymerization, is comparable between the comb electrode substrate and the bare glass substrate. Thus, the thickness and the density of the polymer layer are comparable between the comb electrode substrate and the bare glass substrate.

If the baking time for forming an alignment film is different between the comb electrode substrate and the bare glass substrate of Example 1, the polymerizable monomer excited by light irradiation also transfers to the interfaces after polymerization as in the case of the same baking time. Here, the state of the interface between each alignment film and the liquid crystal is different between the comb electrode substrate and the bare glass substrate. Thus, the thickness, density or both of them of the resulting polymer layer are different between the comb electrode side and the bare glass side.

Figure 4:
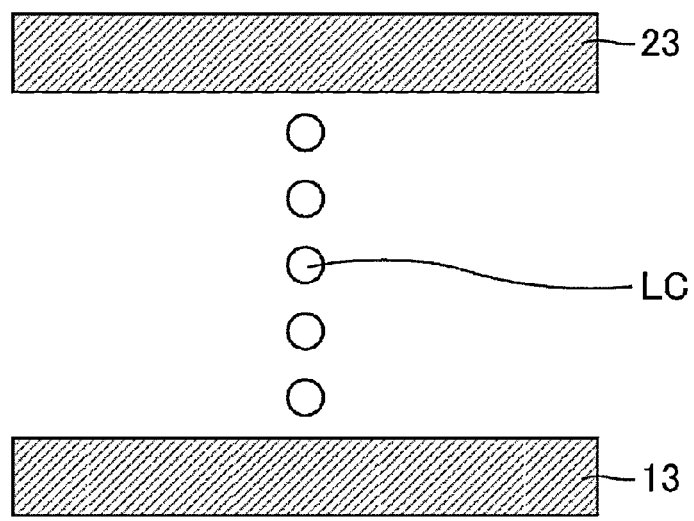
FIG. 4 is a schematic view illustrating the alignment of liquid crystal molecules of a liquid crystal cell of a display mode of a transverse electric field under no voltage application to a liquid crystal layer.
Figure 5:
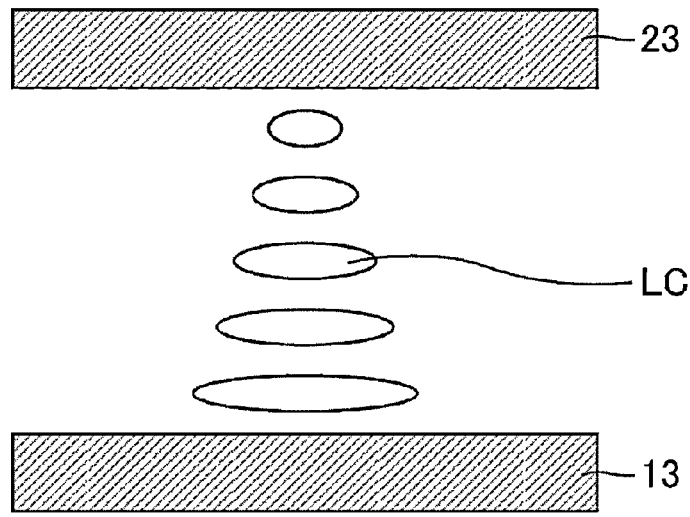
FIG. 5 is a schematic view illustrating the alignment of liquid crystal molecules of a liquid crystal cell of a display mode of a transverse electric field when a voltage applied to the liquid crystal layer is equal to or higher than a threshold voltage.

FIG. 4 is a schematic view illustrating the alignment of liquid crystal molecules of a transverse electric field-type liquid crystal cell under no voltage application to the liquid crystal layer ($V_{off}$ state). FIG. 5 is a schematic view illustrating the alignment of liquid crystal molecules of a transverse electric field-type liquid crystal cell when a voltage applied to the liquid crystal layer is equal to or higher than a threshold voltage ($V_{on}$ state).

In a display mode of a transverse electric field, such as an IPS mode, electrodes are formed on one substrate. When a voltage is applied, liquid crystal molecules (LC) on the comb electrode substrate side (on the side of the substrate including an active element) widely move. After continuous voltage application, the alignment of the liquid crystal molecules (LC) cannot be brought back to the initial alignment, thereby causing image sticking. Thus, it is important that the alignment control on the comb electrode side is enhanced for reducing image sticking.

The liquid crystal cell of Example 1 included a polymer layer efficiently formed on the comb electrode substrate side, and thereby succeeded in enhancing the alignment control on the comb electrode substrate side and thus in increasing the effects of reducing image sticking.

Figure 6:
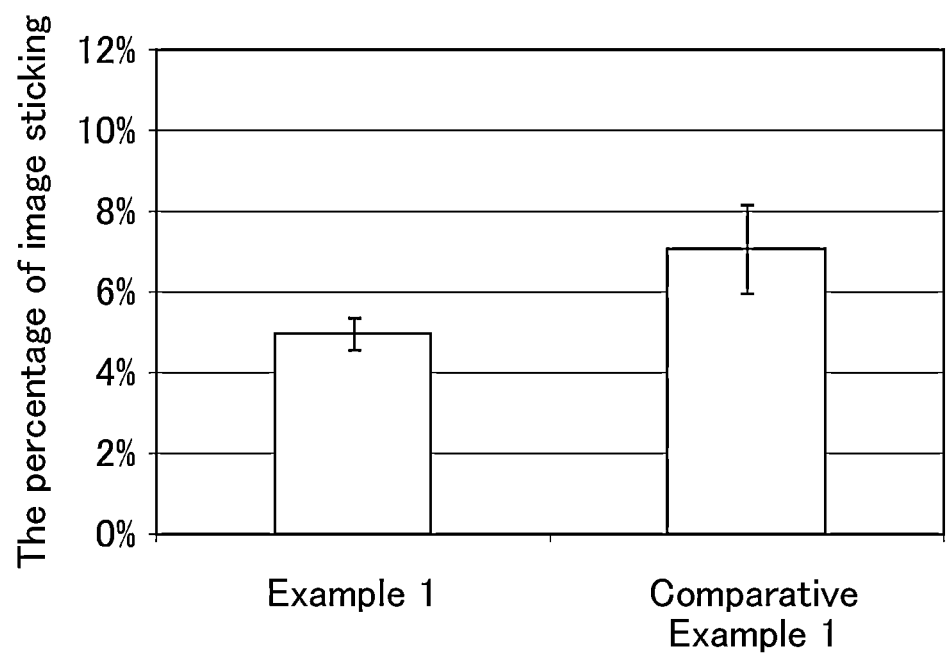
FIG. 6 is a graph showing the percentage of image sticking in Example 1 and Comparative Example 1.

FIG. 6 is a graph showing the percentage of image sticking in Example 1 and Comparative Example 1.

Comparison between Example 1 and Comparative Example 1 indicates that the liquid crystal cell of Example 1 made improvements in the evaluation for the percentage of image sticking and the visual evaluation of display.

Conventional methods for reducing image sticking include increasing the amount of the photopolymerizable monomer to be added to the liquid crystal and increasing the irradiation amount of ultraviolet light for reacting the photopolymerizable monomer. As described above, the method of the present invention can form a polymer layer effectively reducing image sticking without increasing the amount of the photopolymerizable monomer to be added to the liquid crystal, and thus contributes to reduction of image sticking with reduced amounts of materials. In addition, the method of the present invention can form a polymer layer effectively reducing image sticking without increasing the irradiation amount of ultraviolet light for reacting the photopolymerizable monomer, and thus contributes to reduction of image sticking with reduced operation time (takt time) for production.

Example 2

Figure 7:
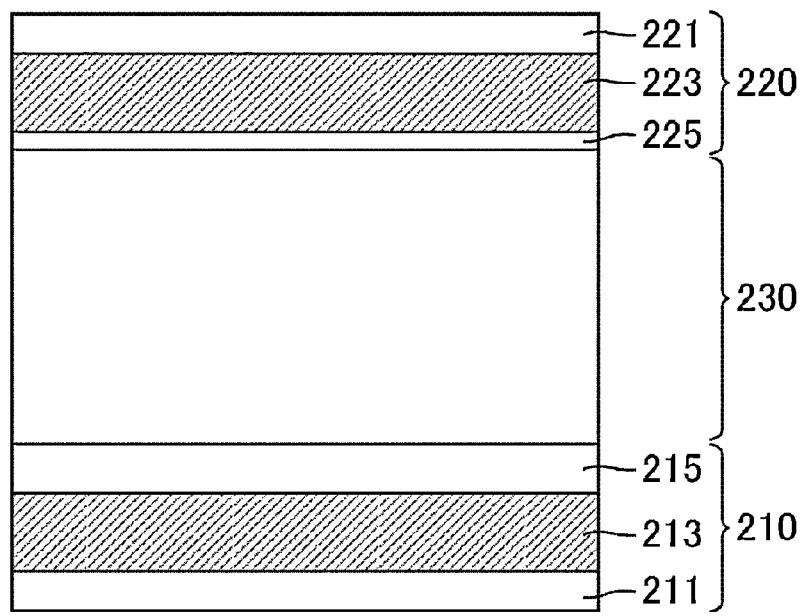
FIG. 7 is a schematic cross-sectional view illustrating a liquid crystal cell of Example 2.

FIG. 7 is a schematic cross-sectional view illustrating a liquid crystal cell of Example 2.

The liquid crystal cell of Example 2 was produced in the same manner as in Example 1 except that a bare glass substrate and a comb electrode substrate, to each of which a polyvinyl cinnamate solution prepared in the same manner as in Example 1 was applied, were temporarily baked at 90° C. for 1 minute; an alignment film 223 was then formed by baking the bare glass substrate at 230° C. for 40 minutes; and an alignment film 213 was formed by baking the comb electrode substrate at 230° C. for 180 minutes. A resulting polymer layer 215 of the comb electrode substrate 210 had a larger thickness, a higher density, or both of these than a simultaneously obtained polymer layer 225 of the bare glass substrate 220.

Comparative Example 2

Figure 8:
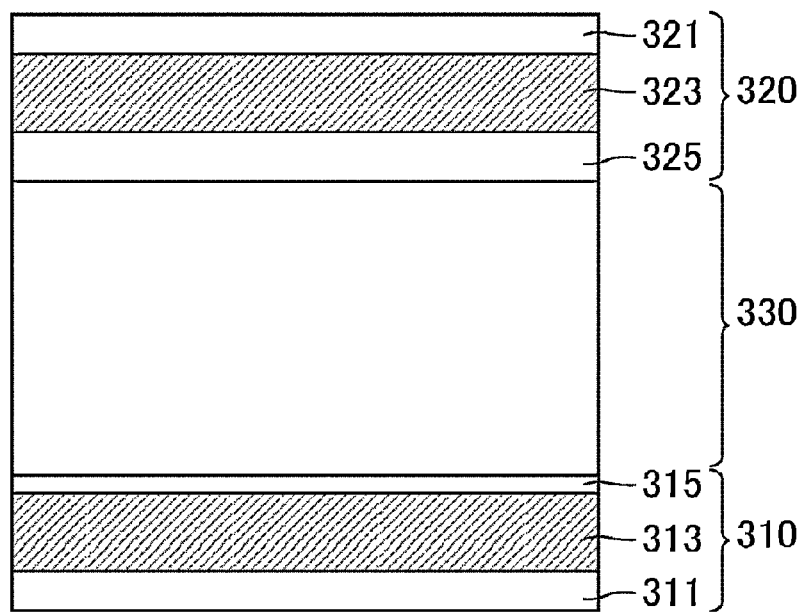
FIG. 8 is a schematic cross-sectional view illustrating a liquid crystal cell of Comparative Example 2.

FIG. 8 is a schematic cross-sectional view of a liquid crystal cell of Comparative Example 2.

The liquid crystal cell of Comparative Example 2 was produced in the same manner as in Example 1 except that the baking times for forming alignment films were changed. Specifically, an alignment film 323 was formed by baking a bare glass substrate at 230° C. for 180 minutes, and an alignment film 313 was formed by baking a comb electrode substrate at 230° C. for 40 minutes. A resulting polymer layer 315 of the comb electrode substrate 310 had a smaller thickness, a lower density, or both of these than a simultaneously obtained polymer layer 325 of the bare glass substrate 320.

In Example 2, as in the case of Example 1, since the baking time for forming an alignment film was set differently between the two substrates, the thickness and/or density of the resulting polymer layer were/was different between the comb electrode substrate and the bare glass substrate. In Example 2, in which the baking time for forming the alignment film of the comb electrode substrate is longer than in Example 1, the resulting polymer layer of the comb electrode substrate side was also advantageous to reduce image sticking.

Figure 9:
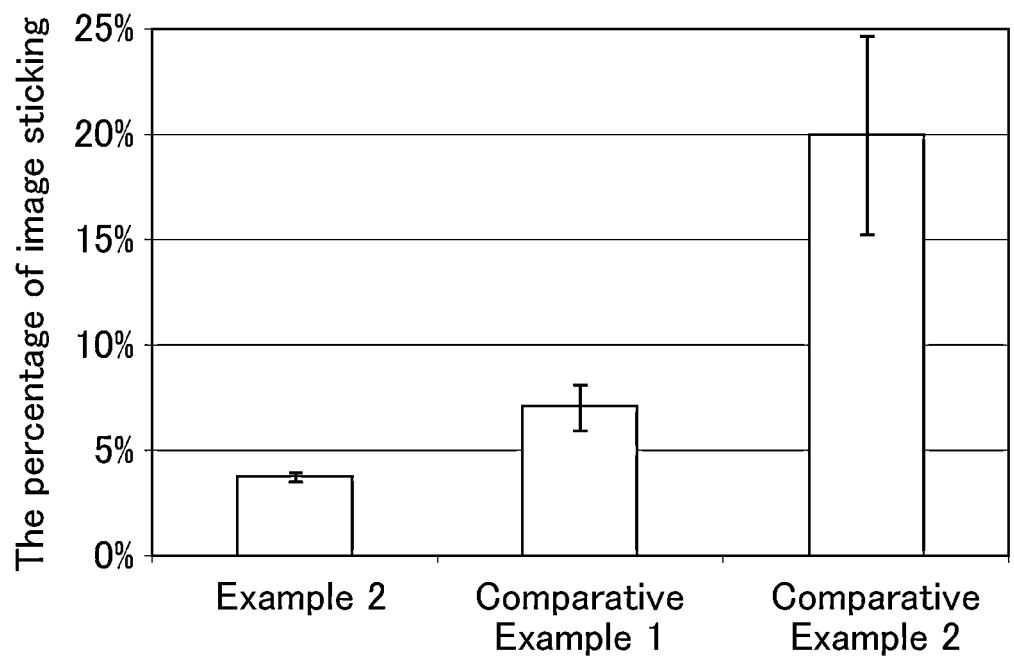
FIG. 9 is a graph showing the percentage of image sticking in Example 2 and Comparative Examples 1 and 2.

FIG. 9 is a graph showing the percentage of image sticking in Example 2 and Comparative Examples 1 and 2.

Comparison between Example 2 and Comparative Example 1 indicates that the liquid crystal cell of Example 2 made improvements in the evaluation for the percentage of image sticking and the visual evaluation of display.

Thus, the liquid crystal cell of Example 2, in which the baking time for forming an alignment film on the comb electrode substrate side (180 minutes) was longer than that of Example 1 (90 minutes), also achieved the effects of reducing image sticking. The liquid crystal cell of Example 2 thus contributes to reduction of image sticking with reduced amounts of materials and reduced operation time for production, as in Example 1.

Meanwhile, in Comparative Example 2, the baking time conditions were contrastive to those of Example 2, namely, the baking time for forming the alignment film of the comb electrode substrate was shorter than that of the bare glass substrate. The image sticking characteristics in Comparative Example 2 was worse than in Example 2 and Comparative Example 1 in which the baking time was the same between the two substrates. Comparison of the mechanism of Comparative Example 2 with that of Example 1 indicates the following. In Example 2, a polymer layer was efficiently formed on the comb electrode substrate side where liquid crystal molecules widely move (liquid crystal molecules more elastically deform). In contrast, in Comparative Example 2, the photopolymerizable monomer was concentrated to the bare glass substrate side. Thus, the polymer layer on the comb electrode substrate side had a smaller thickness, which deteriorated the alignment control of the liquid crystal molecules on the comb electrode substrate side where liquid crystal molecules widely move and thereby presumably adversely affected the image sticking characteristics.

Embodiment 2

A liquid crystal display device of Embodiment 2 includes a liquid crystal cell in which the polymer layer of the substrate including an active element has a larger thickness, a higher density, or both of these than the polymer layer of the counter substrate which is a substrate different from the substrate including an active element. In Embodiment 2, the base film of the substrate including an active element is formed under film forming conditions different from those of the base film of the counter substrate. Specifically, the time for leaving the substrate including an active element in the air between the step of forming a base film of the substrate including an active element and the step of bonding both substrates together is longer than the time for leaving the counter substrate in the air between the step of forming a base film of the counter substrate and the step of bonding both substrates together. For example, the time for leaving the substrate including an active element in the air is preferably 40 to 56 hours, and the time for leaving the counter substrate in the air is preferably 16 to 32 hours. The difference in the time for leaving the substrate in the air between the substrate including an active element and the counter substrate is preferably 18 hours or longer, for example. The upper limit of the difference is preferably 30 hours or shorter, for example. Thereby, the polymer layer on the base film of the substrate including an active element can have a larger thickness, a higher density, or both of these than the polymer layer on the base film of the counter substrate. If the voltage applied to the liquid crystal layer is equal to or higher than the threshold voltage, image sticking can be favorably reduced by making the polymer layer thicker on the substrate side where liquid crystal molecules more elastically deform. Other preferred configurations of Embodiment 2 are the same as those mentioned in Embodiment 1. The following describes an example of an actually produced liquid crystal cell to be installed in the liquid crystal display device of Embodiment 2.

Example 3

Figure 10:
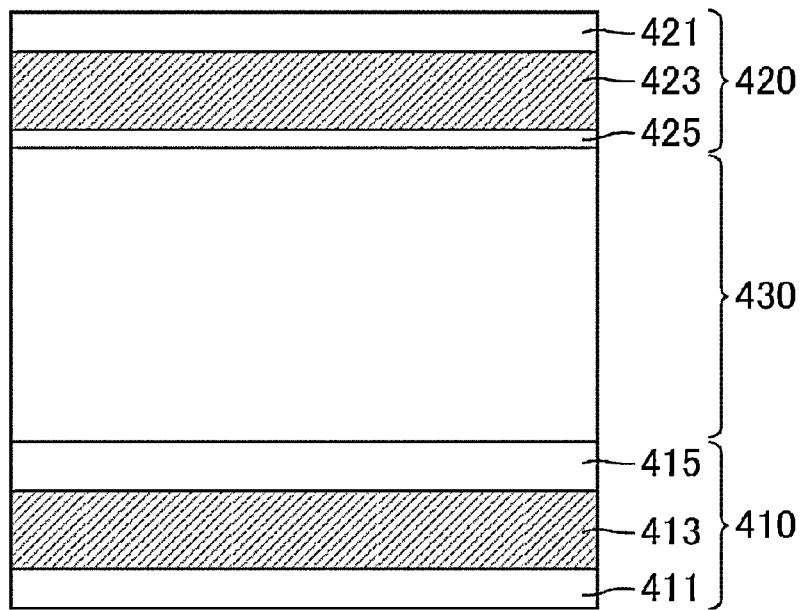
FIG. 10 is a schematic cross-sectional view illustrating a liquid crystal cell of Example 3.

FIG. 10 is a schematic cross-sectional view of a liquid crystal cell of Example 3.

In Example 3, a comb electrode substrate and a bare glass substrate, to each of which a polyvinyl cinnamate solution prepared in the same manner as in Example 1 was applied, were temporarily baked at 90° C. for 1 minute and were then further baked at 230° C. for 40 minutes. The thickness of each of the alignment films 413 and 423 was set to 100 nm. The alignment films were irradiated with ultraviolet light. Then, the comb electrode substrate including the alignment film 413 was left in the air for 48 hours, and the bare glass substrate including the alignment film 423 was left in the air for 24 hours. Subsequently, through seal printing and beads spreading, the substrates were bonded together. Except for these steps, the liquid crystal cell of Example 3 was produced in the same manner as in Example 1. A resulting polymer layer 415 of the comb electrode substrate 410 had a larger thickness, a higher density, or both of these than the polymer layer 425 of the bare glass substrate 420.

Comparative Example 3

Figure 11:
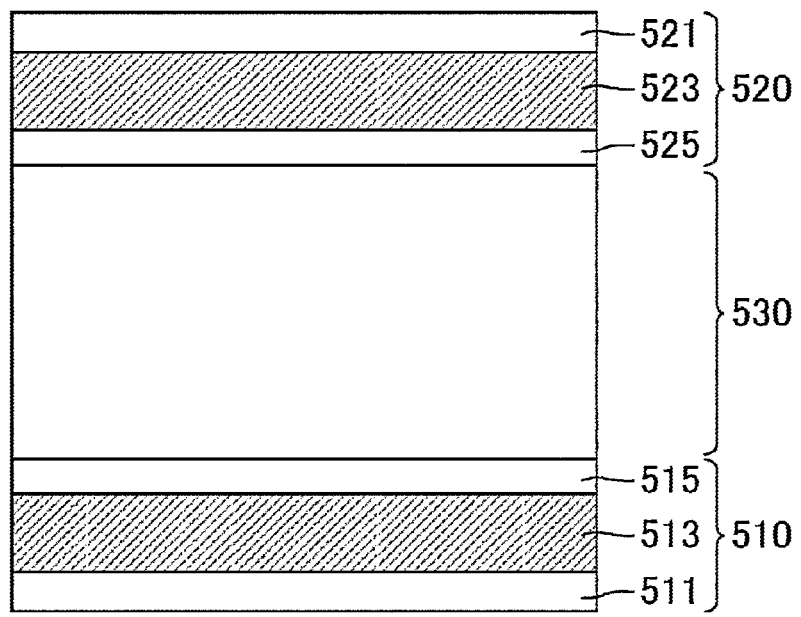
FIG. 11 is a schematic cross-sectional view illustrating a liquid crystal cell of Comparative Example 3.

FIG. 11 is a schematic cross-sectional view of a liquid crystal cell of Comparative Example 3.

The liquid crystal cell of Comparative Example 3 was produced in the same manner as in Example 3 except that the time for leaving the alignment film in the air was set to 24 hours both for a comb electrode substrate including an alignment film 513 and for the bare glass substrate including an alignment film 523, thereby forming a cell with symmetric alignment films. A resulting polymer layer 515 of the comb electrode substrate 510 had a thickness and density comparable to a simultaneously obtained polymer layer 525 of the bare glass substrate 520.

Comparative Example 4

Figure 12:
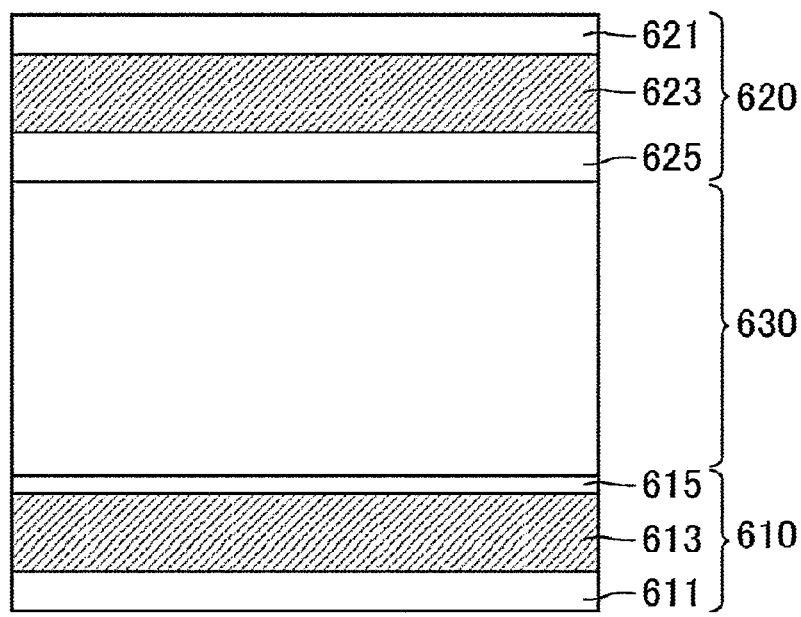
FIG. 12 is a schematic cross-sectional view illustrating a liquid crystal cell of Comparative Example 4.

FIG. 12 is a schematic cross-sectional view of a liquid crystal cell of Comparative Example 4.

The liquid crystal cell of Comparative Example 4 was produced in the same manner as in Example 3 except that the times for leaving the alignment films in the air were changed. Specifically, the time of leaving a bare glass substrate including an alignment film 623 in the air was 48 hours, and the time of leaving a comb electrode substrate 610 including an alignment film 613 in the air was 24 hours. A resulting polymer layer 615 of the comb electrode substrate 610 had a smaller thickness, a lower density, or both of these than a simultaneously obtained polymer layer 625 of the bare glass substrate 620.

Figure 13:
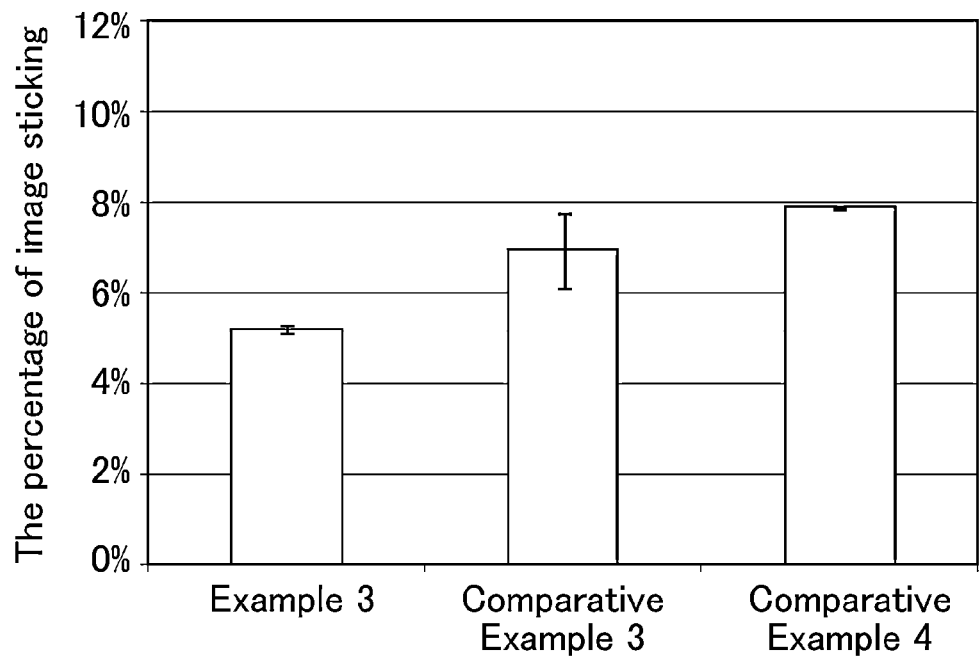
FIG. 13 is a graph showing the percentage of image sticking in Example 3 and Comparative Examples 3 and 4.

FIG. 13 is a graph showing the percentage of image sticking in Example 3 and Comparative Examples 3 and 4.

According to general knowledge, leaving an alignment film in the air for a long time encourages a polymer to absorb moisture contained in the air, and thereby leads to deterioration of the alignment film. This deterioration presumably inhibits formation of a polymer layer to cause severe image sticking. In contrast to the conventional knowledge, the present invention succeeded in reducing image sticking.

If the time for leaving the alignment film in the air is the same between the comb electrode substrate and the bare glass substrate, the proportion of diffusion of the polymerizable monomer, which is excited by light irradiation and transfers to the interfaces after polymerization, is comparable between the comb electrode substrate and the bare glass substrate. Thus, the thickness of the polymer layer is comparable between the comb electrode substrate and the bare glass substrate.

If the time for leaving the alignment film in the air is different between the comb electrode substrate and the bare glass substrate as mentioned in Example 3, the polymerizable monomer excited by light irradiation also transfers to the interfaces after polymerization as in the case of the same leaving time. The state of the interface between the alignment film and liquid crystal, however, is different between the comb electrode substrate and the bare glass substrate, which causes different proportions of monomer diffusion. Thus, the thickness of the polymer layer is different between the comb electrode substrate and the bare glass substrate.

Comparison between Example 3 and Comparative Examples 3 and 4 indicates that the liquid crystal cell of Example 3 made improvement in the evaluation for the percentage of image sticking and the visual evaluation of display.

Thus, Example 3 contributes to reduction of image sticking with reduced amounts of materials or reduced operation time for production, as in Example 1.

Meanwhile, in Comparative Example 4, the leaving time conditions were contrastive to that of Example 3, namely, the time for leaving the comb electrode substrate in the air was shorter than that for the bare glass substrate. The image sticking characteristics in Comparative Example 4 were worse than in Example 3 and Comparative Example 3 in which leaving conditions were the same between the two substrates. Comparison of the mechanisms of these cases with the mechanism of Example 1 indicates the following. In Example 3, a polymer layer was efficiently formed on the comb electrode substrate side where liquid crystal molecules widely move (liquid crystal molecules more elastically deform). In contrast, in Comparative Example 4, the photopolymerizable monomer was concentrated to the bare glass substrate side. Thus, the polymer layer on the comb electrode substrate side had a smaller thickness, which deteriorated the alignment control of the liquid crystal molecules on the comb electrode substrate side where liquid crystal molecules widely move and thereby presumably adversely affected the image sticking characteristics.

Embodiment 3

A liquid crystal display device of Embodiment 3 includes a liquid crystal cell in which the polymer layer on the substrate including an active element has a larger thickness, a higher density, or both of these than the polymer layer of the counter substrate. In Embodiment 3, the base film of the substrate including an active element is formed under film forming conditions different from those of the substrate different from the substrate including an active element. Specifically, the base film of the substrate including an active element has a smaller thickness than the base film of the counter substrate. For example, the base film of the substrate including an active element has a thickness of preferably 70 to 90 nm while the base film of the counter substrate has a thickness of preferably 110 to 130 nm. The difference in the thickness between the base film of the substrate including an active element and the base film of the counter substrate is preferably 30 nm or larger, for example. The upper limit of the difference is preferably 50 nm or smaller, for example. Thereby, the polymer layer on the base film of the substrate including an active element can have a larger thickness, a higher density, or both of these than the polymer layer on the base film of the counter substrate. If a voltage equal to or higher than the threshold voltage is applied to the liquid crystal layer, image sticking can be favorably reduced by making the polymer layer thicker on the substrate side where liquid crystal molecules more elastically deform. Other preferred configurations of Embodiment 3 are the same as those mentioned in Embodiment 1. The following describes an example of an actually produced liquid crystal cell to be installed in the liquid crystal display device of Embodiment 3.

Example 4

Figure 14:
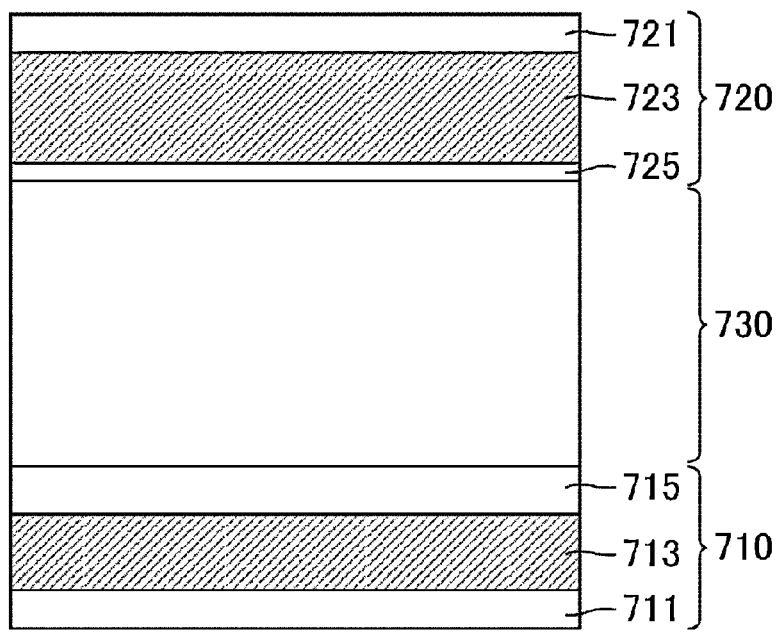
FIG. 14 is a schematic cross-sectional view illustrating a liquid crystal cell of Example 4.

FIG. 14 is a schematic cross-sectional view of a liquid crystal cell of Example 4.

A comb electrode substrate and a bare glass substrate to each of which a polyvinyl cinnamate solution prepared in the same manner as in Example 1 was applied were temporarily baked at 90° C. for 1 minute and were further baked at 230° C. for 40 minutes to form alignment films 713 and 723. The thickness of the alignment film 713 of the comb electrode substrate 710 was set to 80 nm (800 Å) and the thickness of the alignment film 723 of the bare glass substrate 720 was set to 120 nm (1200 Å). Except for these steps, the liquid crystal cell of Example 4 was produced in the same manner as in Example 1. A resulting polymer layer 715 of the comb electrode substrate 710 had a larger thickness, a higher density, or both of these than a simultaneously obtained polymer layer 725 of the bare glass substrate 720.

Comparative Example 5

Figure 15:
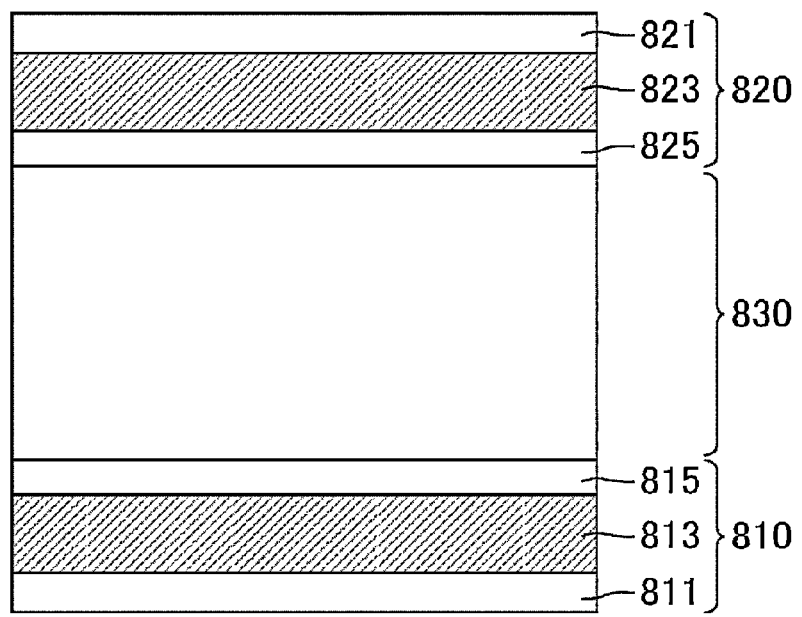
FIG. 15 is a schematic cross-sectional view illustrating a liquid crystal cell of Comparative Example 5.

FIG. 15 is a schematic cross-sectional view of a liquid crystal cell of Comparative Example 5.

The liquid crystal cell of Comparative Example 5 was produced in the same manner as in Example 4 except that the thickness of an alignment film 813 of a comb electrode substrate 810 was set to 80 nm (800 Å), the film thickness of an alignment film 823 of a bare glass substrate 820 was set to 80 nm (800 Å), and the liquid crystal cell thus had no thickness difference between the alignment films of the comb electrode substrate and the bare glass substrate. A resulting polymer layer 815 of the comb electrode substrate 810 had a thickness and density comparable to a simultaneously obtained polymer layer 825 of the bare glass substrate 820.

Comparative Example 6

Figure 16:
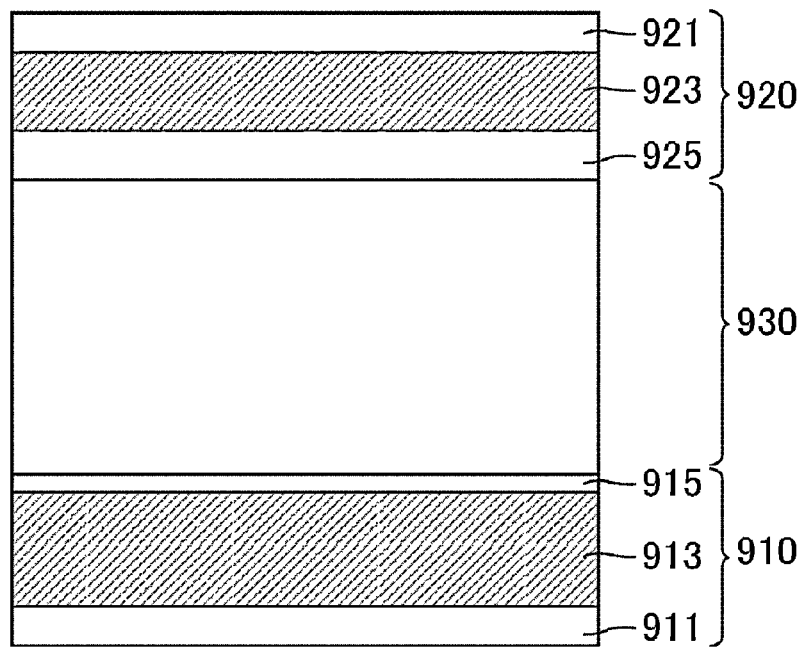
FIG. 16 is a schematic cross-sectional view illustrating a liquid crystal cell of Comparative Example 6.

FIG. 16 is a schematic cross-sectional view of a liquid crystal cell of Comparative Example 6.

In Comparative Example 6, the thickness of an alignment film 913 of a comb electrode substrate 910 was set to 120 nm (1200 Å), and the thickness of an alignment film 923 of a bare glass substrate 920 was set to 80 nm (800 Å). The liquid crystal cell of Comparative Example 6 thus had a large thickness difference between the alignment films of the comb electrode substrate 910 and the bare glass substrate 920 while the film forming conditions of Comparative Example 6 were contrastive to those of Example 4. Except for these differences, the liquid crystal cell of Comparative Example 6 was produced in the same manner as in Example 4. A resulting polymer layer 915 of the comb electrode substrate 910 had a smaller thickness, a lower density, or both of these than a simultaneously obtained polymer layer 925 of the bare glass substrate 920.

If the thickness of the alignment film is the same between the comb electrode substrate and the bare glass substrate, the proportion of diffusion of the polymerizable monomer, which is excited by light irradiation and transfers to the interfaces after polymerization, is comparable between the comb electrode substrate and the bare glass substrate. Thus, the thickness of the polymer layer is comparable between the comb electrode substrate and the bare glass substrate.

If the thickness of the alignment film is different between the comb electrode substrate and the bare glass substrate, the polymerizable monomer excited by light irradiation also transfers to the interfaces after polymerization as in the case of the same film thickness. The state of the interface between the alignment film and liquid crystal, however, is different between the comb electrode substrate and the bare glass substrate, which causes different proportions of monomer diffusion. Thus, the thickness of the polymer layer is different between the comb electrode substrate and the bare glass substrate.

Figure 17:
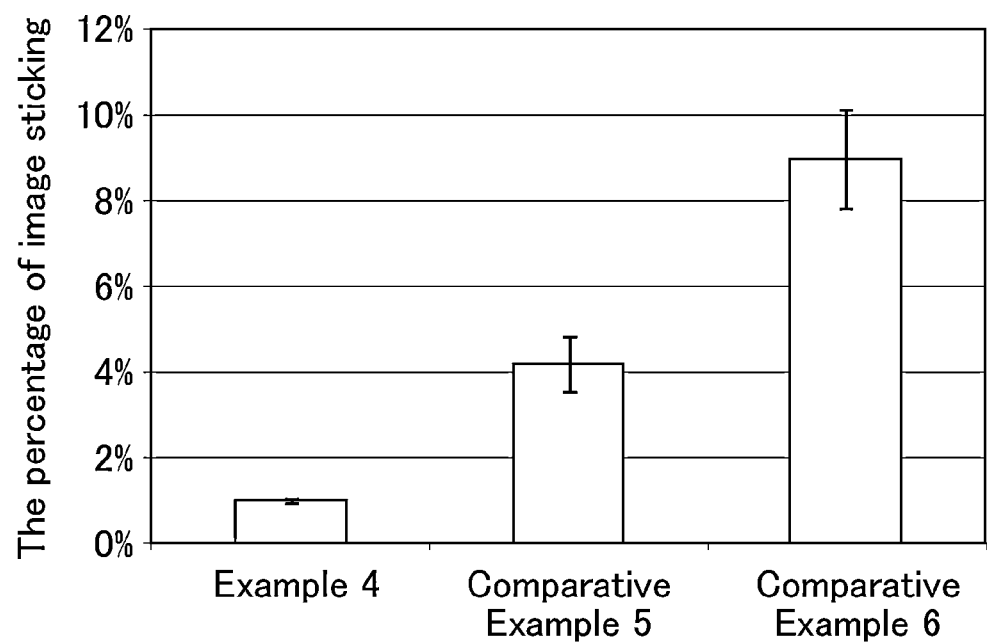
FIG. 17 is a graph showing the percentage of image sticking in Example 4 and Comparative Examples 5 and 6.

FIG. 17 is a graph showing the percentage of image sticking in Example 4 and Comparative Examples 5 and 6.

Comparison between Example 4 and Comparative Examples 5 and 6 indicates that the liquid crystal cell of Example 4 made improvements in the evaluation for the percentage of image sticking and the visual evaluation of display.

The liquid crystal cell of Example 4 thus contributes to reduction of image sticking with reduced amounts of materials and reduced operation time for production, as in Example 1.

Meanwhile, in Comparative Example 6, the film thickness conditions were contrastive to those of Example 4, namely, the thickness of the alignment film of the comb electrode substrate was larger than that of the bare glass substrate. The image sticking characteristics in Comparative Example 6 were worse than in Example 4 and Comparative Example 5 in which the film thickness of the alignment film was the same between the two substrates. Comparison of the mechanisms of these cases with the mechanism of Example 1 indicates the following. In Example 4, a polymer layer was efficiently formed on the comb electrode substrate side where liquid crystal molecules widely move. In contrast, in Comparative Example 6, the photopolymerizable monomer was concentrated to the bare glass substrate side. Thus, the polymer layer on the comb electrode substrate side had a smaller thickness, which deteriorated the alignment control of the liquid crystal molecules on the comb electrode substrate side where liquid crystal molecules widely move and thereby presumably adversely affected the image sticking characteristics.

Mechanism

The following describes the mechanism presumably common in the above mentioned embodiments.

A longer baking time or a longer leaving time more seriously damages the substrate including an active element. Also, under the same baking time conditions, a substrate with a smaller film thickness is more seriously damaged.

The given damage further decomposes the alignment film, which generates more radicals.

The generated radicals more excite the monomer near the alignment film of the damaged substrate, namely, in the present invention, the substrate including an active element.

The monomer thereby tends to be concentrated to the side of the substrate including an active element.

As a result, the polymer layer of the substrate including an active element presumably has an increased degree of polymerization or a larger thickness.

Other Embodiments

Although the above mentioned examples focus on IPS mode liquid crystal cells, the present invention may be suitably applied to other modes, particularly to the modes that can use a horizontal alignment film, such as an FFS mode, an OCB mode, a twisted nematic (TN) mode, a super twisted nematic (STN) mode, an FLC mode, a PDLC mode, and a PNLC mode, in addition to an IPS mode.

Furthermore, the present invention can be widely applied to various treatments, such as a polymer stabilization treatment for expanding the blue phase temperature region of polymer-stabilized blue phase (BP) display devices that do not require an alignment treatment; and a PS treatment for improving the residual charge characteristics of MVA mode display devices and patterned vertical alignment (PVA) mode display devices in each of which liquid crystal is aligned by ribs or slits. In other words, the present invention is applicable for applications in which a polymer needs to be formed from a polymerizable monomer in a liquid crystal layer as well as applications for improving image sticking. Examples of the alignment treatment include a rubbing treatment and a photoalignment treatment. A photoalignment treatment is preferred in terms of easily achieving excellent viewing angle characteristics. Alignment treatments other than a photoalignment treatment, such as a rubbing treatment, may also be performed.

Although the above examples describe liquid crystal cells in which a substrate including an active element includes a pair of comb electrodes consisting of a pixel electrode and a common electrode, the present invention may be suitably applied to liquid crystal cells in which a substrate including an active element includes pixel electrodes and a common electrode (counter electrode) facing to the pixel electrodes (e.g. FFS mode liquid crystal cells). Such a substrate including an active element generates a transverse electric field (an electric field horizontal to the main surface of the substrate or a fringe electric field).

The semiconductor layer used for TFTs may be made of oxide semiconductor indium gallium zinc oxide (IGZO). TFTs may also be made of amorphous silicon.

The technical features described in the embodiments may be combined with each other, and such combinations can achieve novel technical features. For example, the baking time for forming an alignment film of the substrate including an active element may be longer than that of the counter substrate while the time for leaving the alignment film of the substrate including an active element in the air is longer than that of the counter substrate, and/or the alignment film of the substrate including an active element may have a smaller thickness than that of the counter substrate.

REFERENCE SIGNS LIST 10, 110, 210, 310, 410, 510, 610, 710, 810, 910: Comb electrode substrate
11, 21, 111, 121, 211, 221, 311, 321, 411, 421, 511, 521, 611, 621, 711, 721, 811, 821, 911, 921: Transparent substrate
13, 113, 213, 313, 413, 513, 613, 713, 813, 913: Alignment film (on the comb electrode substrate side)
15, 25, 115, 125, 215, 225, 315, 325, 415, 425, 515, 525, 615, 625, 715, 725, 815, 825, 915, 925: Polymer layer (PS layer)
20, 120, 220, 320, 420, 520, 620, 720, 820, 920: Bare glass substrate
23, 123, 223, 323, 423, 523, 623, 723, 823, 923: Alignment film (on the bare glass substrate side)
30, 130, 230, 330, 430, 530, 630, 730, 830, 930: Liquid crystal layer
LC: Liquid crystal molecules

The invention claimed is:

1. A method for manufacturing a liquid crystal display device, the liquid crystal display including a liquid crystal cell including an active substrate including an active element, a counter substrate, and a liquid crystal layer between the active and the counter substrates, the method comprising:
    forming a first base film from a photoactive material on the active substrate;
    forming a second base film from a photoactive material on the counter substrate;
    bonding the active and the counter substrates together; and
    forming a polymer layer to control the alignment of adjacent liquid crystal molecules by polymerizing a monomer on a liquid crystal layer side of each of the first and the second base films, wherein
    base film forming conditions are different between the forming the first base film and the forming the second base film,
    in forming the first and the second base films, the photoactive material is applied to each of the active and the counter substrates and baked to form the first and the second base films having substantially a same thickness on the active and the counter substrates, respectively, and
    a baking time of the photoactive material is longer in the forming the first base film than in the forming the second base film; and
    wherein, the forming the polymer layer provides a polymer layer having a larger thickness, or higher density, or both on the active substrate than on the counter substrate.

2. The method for manufacturing a liquid crystal display device according to claim 1,
    wherein, in the forming the polymer layer, the monomer is polymerized to form the polymer layer.

3. The method for manufacturing a liquid crystal display device according to claim 1,
    wherein the monomer contains at least one selected from a group consisting of acrylate, methacrylate, vinyl, vinyloxy, and epoxy groups.

4. The method for manufacturing a liquid crystal display device according to claim 1,
wherein, in the forming the polymer layer, the monomer is photopolymerized to form the polymer layer.

5. The method for manufacturing a liquid crystal display device according to claim 4,
wherein, in the forming the polymer layer, the monomer is polymerized under ultraviolet light, visible light, or both to form the polymer layer.

6. The method for manufacturing a liquid crystal display device according to claim 1,
wherein each of the first and the second base films is a photoalignment film formed through a photoalignment treatment under ultraviolet light, visible light, or both kinds of light.

7. The method for manufacturing a liquid crystal display device according to claim 1,
wherein each of the first and the second base films is a photoalignment film formed through a photoalignment treatment under linearly polarized light.

8. A method for manufacturing a liquid crystal display device, the liquid crystal display including a liquid crystal cell including an active substrate including an active element, a counter substrate, and a liquid crystal layer between the active and the counter substrates, the method comprising:

forming a first base film from a photoactive material on the active substrate;
forming a second base film from a photoactive material on the counter substrate;
bonding the active and the counter substrates together; and
forming a polymer layer to control the alignment of adjacent liquid crystal molecules by polymerizing a monomer on a liquid crystal layer side of each of the first and the second base films, wherein
base film forming conditions are different between the forming the first base film and the forming the second base film,
in forming the first and the second base films, a surface of each of the active and the counter substrates is subjected to an alignment treatment, and
a time for leaving the active substrate in air between the forming the first base film and the bonding the active and the counter substrates together is longer than a time for leaving the counter substrate in the air between the forming the second base film and the bonding the active and the counter substrates together; and
wherein, the forming the polymer layer provides a polymer layer having a larger thickness, or higher density, or both on the active substrate than on the counter substrate.

* * * * *